United States Patent [19]

Tandon

[11] Patent Number: 5,485,573
[45] Date of Patent: Jan. 16, 1996

[54] METHOD AND APPARATUS FOR ASSISTING IN THE DETERMINATION OF THE SOURCE OF ERRORS IN A MULTI-HOST DATA BASE MANAGEMENT SYSTEM

[75] Inventor: Rajeev P. Tandon, Blaine, Minn.

[73] Assignee: Unisys Corporation, Blue Bell, Pa.

[21] Appl. No.: 92,679

[22] Filed: Jul. 16, 1993

[51] Int. Cl.⁶ ............................................. G06F 11/00
[52] U.S. Cl. .......................... 395/183.01; 395/184.01; 395/185.01; 364/228.3; 364/265; 364/267.7; 364/282.1; 364/DIG. 1
[58] Field of Search ........................ 395/575, 200, 395/600, 650, 183.01, 185.01, 741, 184.01; 364/228.5, 265, 265.3, 266.5, 228.3, 267.7, 282.1; 371/7, 19, 48, 60

[56] References Cited

U.S. PATENT DOCUMENTS

| | | | |
|---|---|---|---|
| 4,414,624 | 11/1983 | Summer et al. | 364/200 |
| 4,638,425 | 1/1987 | Hartung | 364/200 |
| 4,694,396 | 9/1987 | Weisshaar et al. | 364/300 |
| 5,021,997 | 6/1991 | Archie et al. | 371/16.1 |
| 5,060,144 | 10/1991 | Sipple et al. | 364/200 |
| 5,077,658 | 12/1991 | Bendert et al. | 395/600 |
| 5,084,816 | 1/1992 | Boese et al. | 395/575 |
| 5,140,685 | 8/1992 | Sipple et al. | 395/425 |
| 5,161,156 | 11/1992 | Baum et al. | 371/7 |
| 5,161,227 | 11/1992 | Dias et al. | 395/725 |
| 5,165,031 | 11/1992 | Pruul et al. | 395/575 |
| 5,166,674 | 11/1992 | Baum et al. | 395/800 |
| 5,193,162 | 3/1993 | Bordsen et al. | 395/425 |
| 5,197,148 | 3/1993 | Blount et al. | 395/575 |
| 5,212,778 | 5/1993 | Dally et al. | 395/400 |
| 5,222,217 | 6/1993 | Blount et al. | 395/325 |
| 5,226,143 | 7/1993 | Baird et al. | 395/425 |
| 5,247,664 | 9/1993 | Thompson et al. | 395/575 |
| 5,442,785 | 8/1995 | Roffe et al. | 395/658 |

*Primary Examiner*—Robert W. Beausoliel, Jr.
*Assistant Examiner*—Dieu-Minh Le
*Attorney, Agent, or Firm*—LeRoy D. Maunu; Charles A. Johnson; Mark Starr

[57] ABSTRACT

A data base management system operating on a first host processor in a multi-host data processing environment performs consistency checking to detect the occurrence of an error. Based on the severity of the error condition, the data base management system may optionally notify the user of the error condition, save to a file the contents of memory allocated to the data base management system, or abort the data base management system. For error conditions which require either saving the allocated memory or aborting the data base management system, a message is automatically sent to the data base management systems operating on the other host-processors in the multi-host data processing environment. Upon receipt of the message indicative of the error condition, each of the receiving data base management systems saves to a file the contents of memory allocated on the host processor on which each of the receiving data base management systems is operating.

7 Claims, 5 Drawing Sheets

| 0 | PACKET VERSION NUMBER | RESERVED |
|---|---|---|
| 1 | REQUEST TYPE | RESERVED |
| 2 | REQUEST INPUT ||
| 3 | LENGTH ||

FIG. 3

| 0 | RESERVED | FUNCTION | RESERVED |
|---|---|---|---|
| 1 | RESERVED |||
| 2 | SUBFUNCTION |||
| 3 | RESERVED |||
| 4 | RESERVED |||
| 5 | RESERVED |||
| 6 | RESERVED |||

METHOD AND APPARATUS FOR ASSISTING IN THE DETERMINATION OF THE SOURCE OF ERRORS IN A MULTI-HOST DATA BASE MANAGEMENT SYSTEM

CROSS REFERENCE TO CO-PENDING APPLICATIONS

The present Application is related to U.S. Pat. No. 5,442,785 filed Mar. 31, 1994, entitled "METHOD AND APPARATUS FOR PASSING MESSAGES BETWEEN APPLICATION PROGRAMS ON HOST PROCESSORS COUPLED TO A RECORD LOCK PROCESSOR", assigned to the assignee of the present invention and incorporated herein by reference.

BACKGROUND OF THE INVENTION

1. Field of the Invention

This invention generally relates to the detection and identification of errors in programs which execute on multiple host processors and more particularly to the collection of the necessary data for determining the source of errors in a multi-host data base management system.

2. General Discussion

In today's computing environments, application programs are sometimes distributed over one or more host processors to enhance performance. To the extent that distributed application programs share resources and data, they need to coordinate activities to avoid deadlock situations and data corruption. The application programs accomplish this coordination by passing pertinent information amongst themselves. One area in which application programs are typically distributed is Data Base Management Systems (DBMS).

The XTC-UDS (EXtended Transaction Capacity-Universal Data System) which is commercially available from Unisys Corporation is an example of a DBMS in which a DBMS is operable on multiple host processors. The host processor to which the XTC-UDS DBMS is native is the 2200 Series data processing system which is also commercially available from Unisys Corporation. The XTC-UDS DBMS allows data base application programs executing on multiple host processors to share a common database and distribute their processing over several host processors. Applications which utilize a DBMS similar to XTC-UDS are typically transaction intensive and examples include airline reservation systems and bank transaction processing applications.

Along with the rise in processing power provided by deploying a DBMS on several host processors comes the added complexity of dealing with concurrent database applications seeking access to a shared data base. Issues of deadlock detection, cache coherency, exclusive update, etc. must all be addressed for the DBMS to operate properly. Most would agree that with the added complexity and the additional program code required to deal with the complexity, program bugs may go undetected in the course of normal product development, even with the best of software engineering practices.

Once a product goes to market, program errors become even more difficult to isolate due to the performance requirements placed on a commercial product. If a program spends too much time processing trace data to assist in locating logic errors, the program performance may become unacceptable. The problem becomes even more acute in multi-host environments where thousands of transactions are processed each second.

Historically, when a program such as a DBMS detected a problem on a first host processor, it saved the necessary data for later analysis. In addition, the error would be reported to an operator who could take whatever further steps were necessary. Meanwhile, the other host processors in the multihost environment will continue to process transactions. If the operator who became aware of the problem at the first host processor could not act quickly enough, the applications on the other host processors may destroy data which may be critical to discovery of the source of the problem. If the critical data is not available for analysis, the logic problem could go unsolved, only to resurface another day.

This invention provides a method for minimizing the risk of losing data which is critical to fault isolation and provides for collection of the necessary data at multiple host processors without operator intervention.

SUMMARY OF THE INVENTION

It is therefore an object of the present invention to automatically collect data which is required for detecting the source of an error in a multi-host data processing system.

It is a further object to automatically notify each of the host processors in a multi-host data processing system when an error is detected.

Yet another object is to classify error conditions according to the severity of the error so that the appropriate actions can be taken upon detection of an error condition.

In accomplishing the foregoing objectives, a multi-host data base management system operates on two or more host processors. In processing transactions against a data base, the data base management system operating on each of the host processors performs various error checking functions. If an error is detected by a data base management system operating on one of the host processors, that data base management system notifies each of the data base management systems operating on the other host processors that an error was detected. After notifying the data base management systems operating on the other host processor, the data base management system which detected the error saves to a file the contents of memory which it has allocated. Similarly, upon receipt of notification that an error was detected, a data base management system operating on another host processor saves to a file the contents of memory which it has allocated. The timely notification and storage of trace data will assist in the determination of the source of the error.

In another aspect of the invention, upon detection of an error, the error is classified according to the severity of the error. For the least severe errors, the user is notified of the error condition. For errors classified as more severe, notification is provided to the data base management systems operating on the other host processors and the data base management system which detected the error saves to a file the contents of memory it has allocated. The host processors receiving the error notification take action according the severity level of the error indicated in the error notification.

The foregoing and other advantages will become apparent upon study of the preferred embodiment as set forth in the Detailed Description and accompanying drawings.

DESCRIPTION OF THE PREFERRED EMBODIMENT

Figure 1:
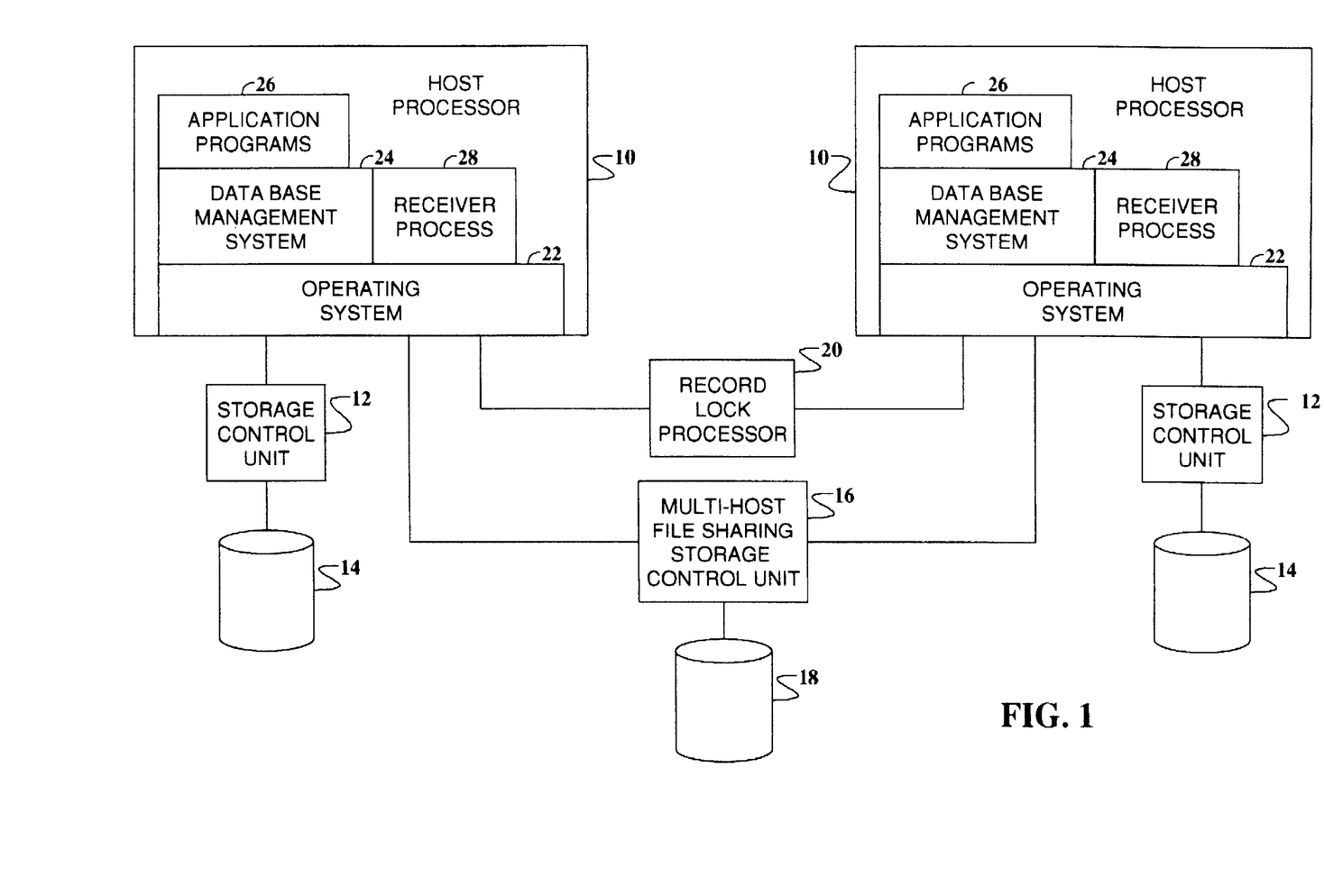
FIG. 1 illustrates a data processing environment in which the present invention could be used.

FIG. 1 illustrates an exemplary multi-host data processing environment in which the present invention could be used. Each Host Processor 10 in the exemplary environment could be either a 2200/400, 2200/600 or 2200/900 Series data processing system, all of which are commercially available from the Unisys Corporation. A Storage Control Unit 12 is coupled to each of the Host Processors 10 for providing access to Mass Storage 14. Mass Storage provides for secondary and long-term storage of data which is accessible to the coupled Host Processor.

A Multi-Host File Sharing (MHFS) Disk Control Unit 16 is also coupled to each of the Host Processors 10. In addition to providing shared access to the Mass Storage 18 for each of the Host Processors 10, the MHFS Storage Control Unit provides shared access to the files stored in Mass Storage 18. The MHFS Storage Control Unit is commercially available from the Unisys Corporation.

A Record Lock Processor (RLP) 20 is directly coupled to each Host Processor 10 and coordinates locking of files, blocks, and data base records between application programs on each of the Host Processors 10 coupled to the RLP 20. The RLP also provides message sending functionality as described in co-pending application Ser. No. 07/773,174. Sending messages through the RLP provides a mechanism, in an environment where Host Processors do not share a common memory, for fast communication between software on a first Host Processor coupled to the RLP and a second Host Processor coupled to the RLP.

Within each Host Processor 10 are blocks which represent the hierarchy of software executing on each of the Host Processors. At the lowest level of the hierarchy is the Operating System 22. The Operating System controls allocation of the Host Processor resources, and also provides a software interface between the hardware (Storage Control Units 12 and 16 and the RLP 20) and other software components. The Operating System of the exemplary environment is the OS/2200 operating system which is commercially available from the Unisys Corporation.

At the next level of the hierarchy is the Data Base Management System (DBMS) 24. The DBMS provides the software modules for Application Programs 26 to create, update, and search data bases. The Operating System 22 provides the software interface between the DBMS and the local Mass Storage 14, the shared Mass Storage 18, and the Record Lock Processor 20. The commercially available XTC-UDS DBMS from Unisys Corporation is an example of a software application which could use the present invention.

The Receiver Processes 28 are used to receive messages sent via the RLP 20. The DBMS 24 on each of the Host Processors 10 in its initial processing initiates one or more separate Receiver Processes and each is idle until a message is received. When the Operating System 22 detects that a message has arrived from the RLP, it awakens one of the Receiver Processes for performing the actions indicated by the message.

Figure 2:
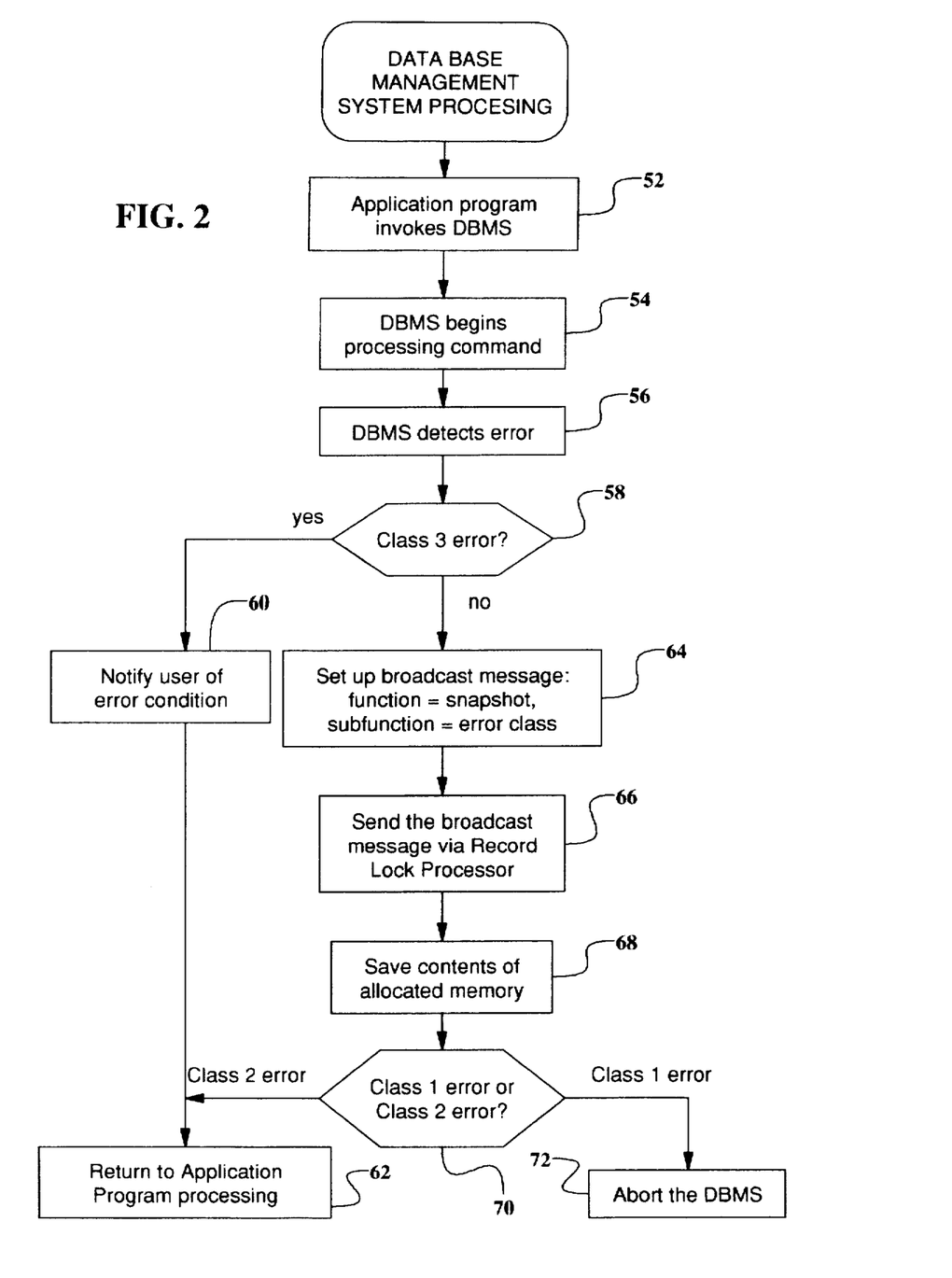
FIG. 2 is a flowchart describing the processing flow of a data base management system in which an error is first detected on a host processor.

FIG. 2 is a flowchart describing the processing flow of a Data Base Management System 24 in which an error is first detected on a Host Processor 10. While this invention is described in an exemplary environment of a multi-host DBMS, those skilled in the art will recognize that the present invention could be applied to other distributed processing applications where saving selected data at each of the distributed Host Processors may be critical to finding the source of an error.

The overall processing of the DBMS 24 in incorporating this invention entails processing data base requests from Application Programs 26, detecting an error condition, broadcasting a message to the other Host Processors 10 in the multi-host environment, and saving to a file the contents of memory allocated to the DBMS. The results of the saving operation are typically referred to as a "snapshot." Processing Step 52 denotes the invocation of the DBMS by an Application Program. The DBMS is invoked when an Application Program makes a program call to one of the available DBMS routines. Typical functions may include searching, updating, adding and deleting of data base records. The DBMS then processes the command based on the parameters supplied to the DBMS routine as shown by Step 54.

During the course of processing a command, the DBMS 24 will typically perform assorted consistency checks on the data base specified in the parameters supplied by the Application Program 26. Any problems identified during the consistency checks are considered errors. One example of a consistency check is ensuring that an Application Program has locked a record in a data base before requesting an update to the record.

Once an error is identified, the subsequent actions taken by the DBMS depend upon the severity of the error. In general, there are three classes of errors, herein referred to as "Class 1", "Class 2", and "Class 3" errors. A Class 3 error is the least severe error and the only action required is to notify the user of the error. An example would be the inability to update a data base because a file has not yet been opened.

A Class 2 error is more serious than a Class 3 error. A Class 2 error requires more than notifying the user of the error condition, it requires saving the state of the data base so that any possible logic errors can be identified. An example of a Class 2 error is where an input/output error is returned from the operating system in an attempt to write to Mass Storage 18. The particular cause of these input/output error is unknown to the DBMS 24, but data base corruption is not a danger for these types of errors.

A Class 1 error is the most severe type of error and requires entirely aborting the DBMS 24 processing. A Class 1 error usually involves the detection of some type of data base corruption and processing must cease to avoid further corruption. An example of this type of error may occur where the DBMS has successfully performed an input/output operation to Mass Storage 18, but upon further processing of the data from the file, the DBMS discovers an inconsistency. In particular, if a record is read from the data base in which the DBMS expects certain data to be contained in that record, and the DBMS finds that the actual data does not match the expected data, the data base is corrupt and processing must cease.

The class of the error detected dictates how the error is remedied. At decision Step 58, if the error is Class 3, processing proceeds to Step 60. Step 60 notifies the user of the error condition. This may be accomplished by sending a message to the operator console associated with the Host Processor 10, or simply returning an error code to the calling Application Program 26. Control is returned to the Application Program as shown at Step 62.

If the error is not a Class 3 error (it's either Class 1 or Class 2), then processing proceeds to Step 64. Step 64 sets up the parameters required for broadcasting a message via the RLP 20. See FIGS. 3 and 4 for details on the RLP parameters. The parameters in the preferred embodiment include a function and a subfunction. The function type indicates to the receiving DBMSs 24 that a snapshot is required. The sub function indicates the class of the error, either Class 1 or Class 2.

Once the necessary parameters are assembled, the Operating System 22 is invoked at Step 66 for sending the broadcast message to the other Host Processors 10 in the multi-host environment. The processing performed at the receiving Host Processors is described in FIGS. 5 and 6. The sending Host Processor does not wait for a response from the receiving Host Processors and immediately proceeds to Step 68. At Step 68, the contents of memory allocated to the DBMS 24 on the sending Host Processor is saved to a dump file. The dump file is then available for analysis by a system programmer for isolating the source of the error.

Decision Step 70 tests whether the error is a Class 1 or Class 2 error. If the error is Class 2, then processing returns to the calling Application Program as indicated by Step 62. For a Class 1 error, the processing of the DBMS 24 and the calling Application Program 26 are aborted as indicated by Step 72.

The OS/2200 operating system provides the software interface for passing messages via the RLP 20. In OS/2200, there are two routines which provide an program callable interface to send messages using the RLP. The first routine is referenced by the mnemonic "ER RLPMSG$", and provides for operation in a basic addressable memory space. The second routine, basically providing the same functionality, is referenced by the mnemonic "CALL UDSRLP$MSG". The only difference between the two routines is that the UDSRLP$MSG routine is available for the extended addressing capabilities of the OS/2200. The extended addressing capability allows the calling program to address a larger memory space. In the discussion which follows each routine and the underlying support software is referred to as the RLP software interface. Each routine of the described RLP software interface expects the same format for each of two parameters which are passed to it. A description of the required format for each of the parameters follows.

Figure 3:
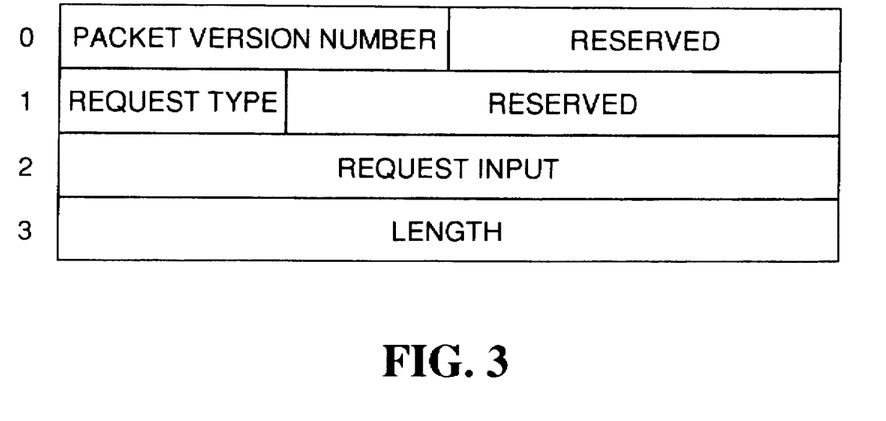
FIG. 3 illustrates the packet format for the first parameter passed to the Record Lock Processor software interface, where the first parameter indicates a function to perform.

FIG. 3 illustrates the packet format for the first parameter passed the RLP software interface. The required packet length is four words with each word having 36 bits. The words are numbered 0 through 3, and the bit positions within each word are numbered 0 through 35.

Bits 0 through 17 of word 0 define the PACKET VERSION NUMBER. This partial word is set by the caller and should be set to match that version number which the RLP Software Interface expects. This is used to ensure that the calling routine is sending the appropriate information to the version of the RLP Software Interface being called. Bits 18 through 35 of word 0, are reserved for future use and must be set to zero.

A REQUEST TYPE is specified in bits 0 through 5 of word 1, and provide the indication to the RLP Software Interface as to the function to perform. The octal value of 01 indicates that the Message Send Function is requested; octal value 02 indicates that the caller is requesting to Register to receive a messages sent through the RLP; and octal value 03 indicates that the Deregister Function is requested. A Deregister request causes the RLP Software Interface to terminate all receiver processes which have registered to receive messages. Bits 6 through 35 of word 1 are reserved for future use and must be set to zero.

All of word 2 is dedicated to input to the RLP Software Interface and is related to the function indicated in word 1. Where the REQUEST TYPE in word 1 is Message Send (01), bits 0 through 35 of word 2 indicate to which Host Processors the message should be sent. If bit 0 is set, the message will be sent to the first Host Processor 10 in the multi-host environment, if bit 1 is set, the message will be sent to the second Host Processor, if bit 3 is set, the message will be sent to third Host Processor, and so on. If all the bits are set, the message is broadcast to all the Host Processors in the multi-host environment. Where the specified REQUEST TYPE is Receiver Registration (02) or Receiver Deregistration (03), word 2 is not used by the RLP Software Interface.

All of word 3 is used to indicate the Length of the second parameter passed to the RLP Software Interface. The current implementation requires that this Length be set to 6 as the second parameter is 6 words long.

Figure 4:
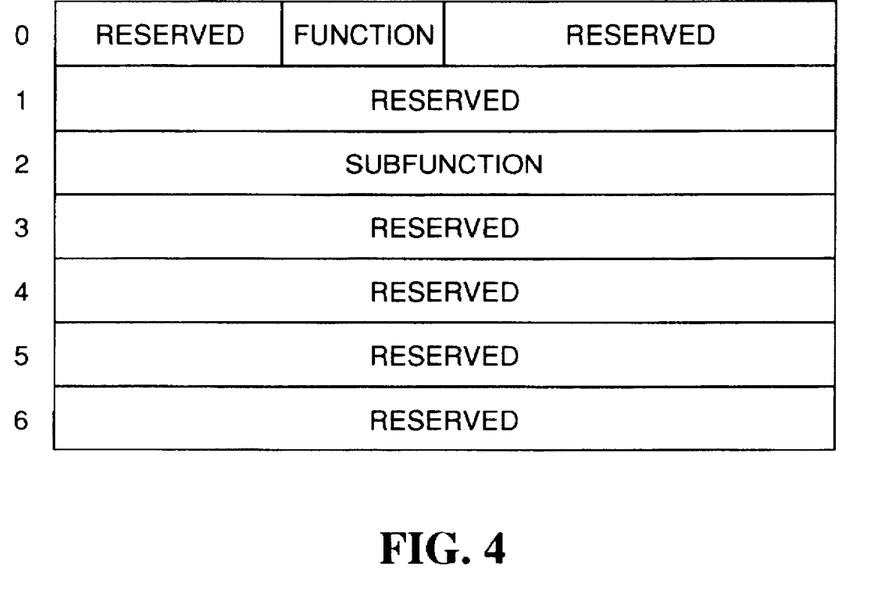
FIG. 4 illustrates the packet format for the second parameter passed to the Record Lock Processor software interface where the second parameter contains the message to send.

FIG. 4 illustrates the packet format for the second parameter passed to the RLP software interface. The second parameter contains the message to send and has six 36-bit words in which the calling routine places the message to be sent to the other Host Processors 10. Additionally, the buffer could include information such as an identifier for the program sending the message and the type of message. When the RLP software interface is called with the Register Function specified, the RLP software interface places messages received through the RLP in this second parameter. For the purposes of this invention, bits 12 through 17 of word 0 contain the FUNCTION and word 2 contains the SUBFUNCTION. The decimal value of 17 in the FUNCTION field, indicates the Snapshot function. In the SUBFUNCTION field, a decimal 1 indicates a Class 1 error and a decimal 2 indicates a Class 2 error. The other fields in the packet are reserved for other uses which are beyond the scope of this invention.

Figure 5:
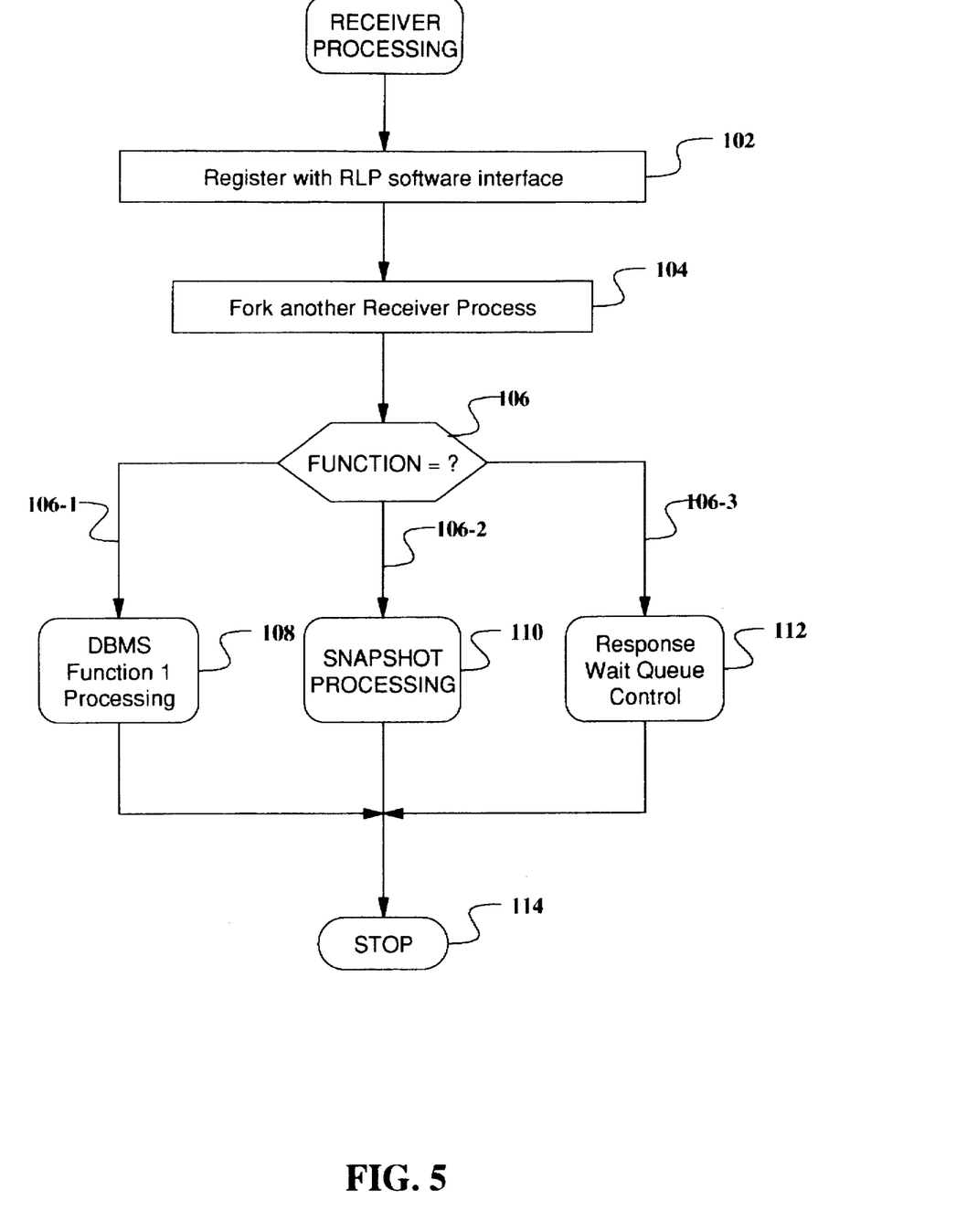
FIG. 5 is a flowchart describing the processing performed by the Receiver Process.

FIG. 5 is a flowchart describing the processing performed by the Receiver Process 28. As previously stated, there may be one or more Receiver Processes started by the DBMS 24, each identical to the others in its processing logic. The purpose for having a plurality of Receiver Processes is to ensure that a Receiver Process is immediately available when messages from the RLP 20 arrive. The Receiver Processes are responsible for processing messages passed through the RLP, and calling the appropriate DBMS software routine as defined by the message received.

The first operation 102 performed by each Receiver Process 28 is to perform a RLP software interface call with the Register function specified. After making the Register request, the RLP software interface suspends execution of the Receiver Process until a message is received from the RLP 20. Upon receipt of a message, the RLP software interface enters the message received in the second parameter provided by the Receiver Process. Execution of the Receiver Process is then resumed at Step 104.

The first action taken by the Receiver Process 28 after resuming execution is to start another Receiver Process as indicated by Step 104. This is done to ensure that there is another Receiver Process available to receive a message once the resumed Receiver Process has begun processing a message.

After starting another Receiver Process 28, decision Step 106 determines what function is specified. For the purpose of describing the preferred embodiment of the present invention, the Receiver Process shows three possible message functions, each indicating a particular routine to call. If the FUNCTION is Function 1 (for illustrative purposes only), control Path 106-1 leads to operation 108 which calls DBMS Function 1; if the function is "Snapshot", control path 106-2 leads to operation 110 for invoking Snapshot processing; and if the type is a "RESPONSE", control Path 106-3 leads to operation 112 which initiates the Response Wait Queue Control. Co-pending application Ser. No. 07/773,174 can be referenced for further details on the Response Wait Queue Control processing. Upon returning from the selected routine, the Receiver Process completes execution at step 114.

Figure 6:
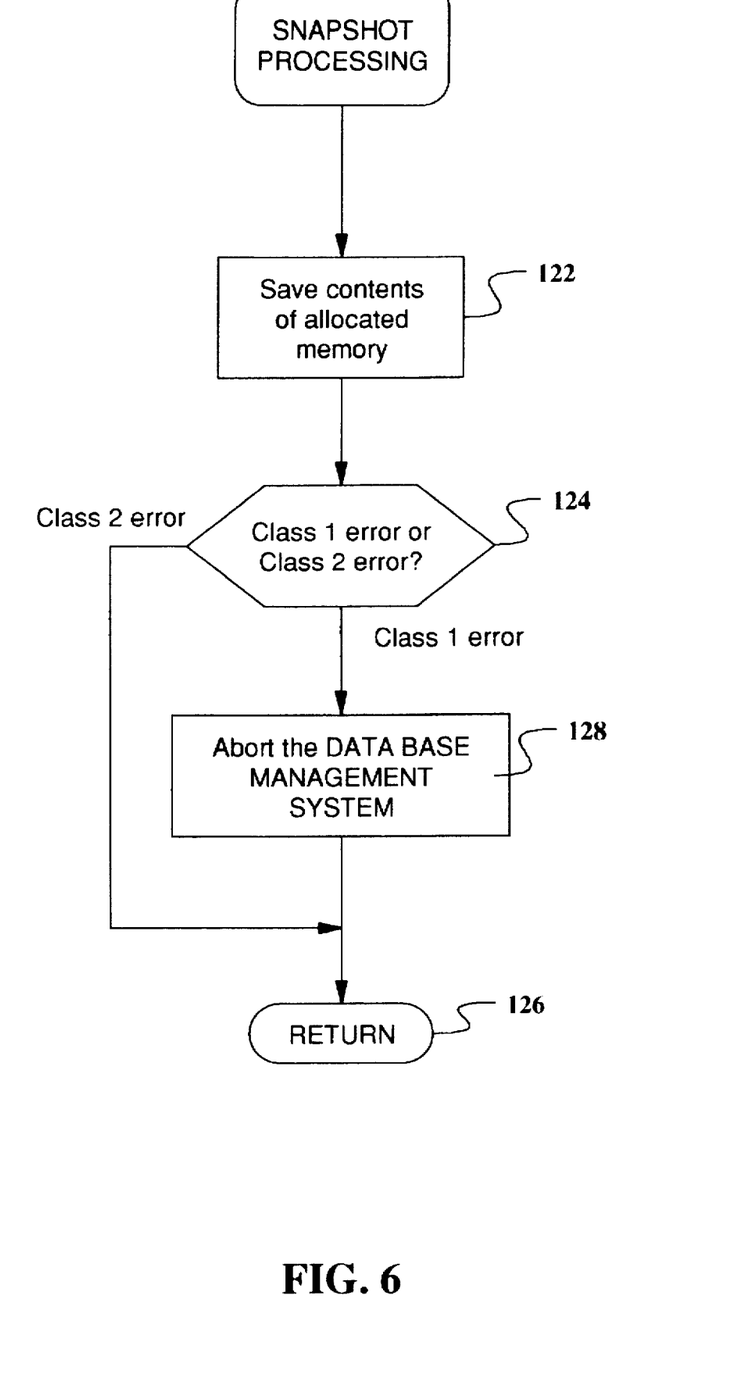
FIG. 6 is a flowchart describing the processing flow of a receiving Host Processor 10 upon notification from a sending Host Processor that an error was detected on the sending Host Processor.

FIG. 6 is a flowchart describing the processing flow for Snapshot processing. Snapshot processing is invoked from the Receiver Process 28 on a Host Processor 10 which has received a message via the RLP 20. As will be recalled, the Snapshot function is sent to the other Host Processors in a multi-host environment when a DBMS 24 on one of the Host Processors detects either a Class 1 or Class 2 error. It should be noted that the processing shown in FIG. 5 would be identical for each receiving Host Processor in a multi-host environment and that the present invention is not limited to two Host Processors. The processing performed by the receiving Host Processor is similar to the Class 1 or Class 2 error processing of the Host Processor which detected the error.

The first operation performed by the Snapshot processing of the DBMS 24 on the receiving Host Processor 10 is to save the contents of memory allocated to the DBMS to a dump file as shown by Step 122. The dump file is then available for analysis by a system programmer for isolating the source of the error.

Decision Step 124 tests whether the error is a Class i or Class 2 error. If the error is Class 2, then processing returns to the Receiver Process as indicated by Step 126. For a Class 1 error, the processing of the DBMS 24 is aborted as indicated by Step 128. After aborting the DBMS, control is returned to the Receiver Process at Step 126.

While the present invention is described in the exemplary environment of a multi-host data base management system, those skilled in the art will recognize that the invention could be easily adapted to other environments in which a critical error is detected on a first Host Processor 10 and data held by another Host Processor may be critical in determining the source of the error. Therefore, having described the preferred embodiment of the invention in the drawings and accompanying description, those skilled in the art will recognize that various modifications to the exemplary and preferred embodiment could be made without departing from the scope and spirit of the claims set forth below:

That which is claimed is:

1. In a multi-host data processing system having a first host processor and a second host processor, each having a memory, mass storage coupled to each of the host processors for long term storage of data, and a record lock processor for providing message passing between the coupled host processors, the multi-host data processing system further including a first data base management system operable on the first host processor, and a second data base management system operable on the second host processor, wherein the first and second data base management systems provide distributed processing of transactions against a data base which is accessible to application programs on each of the host processors, a method for assisting in determining an error source in a multi-host data base management system comprising the steps of:

(a) detecting an error condition in the first data base management system by the first data base management system;

(b) automatically sending notification of said error condition to the second data base management system;

(c) upon detection of said error condition, saving to a first file on the mass storage all portions of the memory of the first host processor that are utilized by the first data base management system, whereby said first file is available for analysis after said portions of the memory are subsequently changed; and (d) automatically saving to a second file on the mass storage all portions of the memory of the second host processor that are utilized by the second data base management system upon receipt of notification of said error condition whereby said second file is available for analysis after said portions of the memory are subsequently changed.

2. The method of claim 1, further comprising the steps of:

(e) classifying said error condition into either a first error class or a second error class, wherein said first error class and said second error class indicate levels of severity of said error condition; and (f) performing steps (b) through (d) only if said error condition is within said second error class.

3. The method of claim 2, further comprising the step of:

(g) notifying a user of said error condition if said error condition is within said first error class.

4. The method of claim 1, further comprising the steps of:

(e) classifying said error condition into either a first error class, a second error class, or a third error class, wherein said first error class, said second error class, and said third error class indicate levels of severity of said error condition;

(f) performing steps (b) through (d) only if said error condition is within said second error class or said third error class;

(g) aborting the first data base management system if said error condition is in said third error class; and (h) automatically aborting the second data base management system if said error condition is in said third error class.

5. In a multi-host data processing system having a first host processor and a second host processor, each having a memory, mass storage coupled to each of the host processors for long term storage of data, and a record lock processor for providing message passing between the coupled host processors, the multi-host data processing system further including a first data base management system operable on the first host processor, and a second data base management system operable on the second host processor, wherein the first and second data base management systems provide distributed processing of transactions against a data base which is accessible to application programs on each of the host processors, a method for assisting in determining an error source in a multi-host data base management system comprising the steps of:

(a) detecting an error condition in the first data base management system by the first data base management system;

(b) classifying said error condition into either a first error class, a second error class, or a third error class, wherein said first error class, said second error class, and said third error class indicate levels of severity of said error condition;

(c) notifying a user of said error condition if said error condition is within said first error class;

(d) automatically sending notification of said error condition to the second data base management system if said error condition is in said second error class or said third error class;

(e) upon detection of said error condition, saving to a first file on the mass storage all portions of the memory on the first host processor that are utilized by the first data base management system if said error condition is in either said second error class or said third error class, whereby said first file is available for analysis after said portions of the memory are subsequently changed;

(f) aborting the first data base management system if said error condition is in said third error class;

(g) automatically saving to a second file on the mass storage all portions of the memory on the second host processor that are utilized by the second data base management system upon receipt of notification of said error condition if said error condition is in said second error class or said third error class, whereby said second file is available for analysis after said portions of the memory are subsequently changed; and (h) automatically aborting the second data base management system if said error condition is in said third error class.

6. An improved multi-host data processing system for assisting in determining an error source, comprising:

a first host processor and a second host processor, wherein each of said first and second host processors includes a memory and an operating system for allocating host processor resources;

mass storage means coupled to said first host processor and said second host processor for retentive storage of data;

first data base management means operating on said first host processor for providing access to a data base, wherein said first data base management means is interfaced with said operating system of said first host processor;

second data base management means operating on said second host processor for providing access to said data base, wherein said second data base management means is interfaced with said operating system of said second host processor;

wherein said first data base management means includes first error detection means for detecting an error within said first data base management means and said second data base management means includes second error detection means for detecting an error within said second data base management means;

first saving means interfaced with said first error detection means for saving to a first file on said mass storage means all portions of memory of said first host processor that are utilized by said first data base management means upon detection of an error;

sending means interfaced with said error detection means for sending notification to said second data base management means upon detection of an error by said first error detection means;

receiving means operable on said second host processor and interfaced with said sending means and interfaced with said second data base management means for receiving said notification; and second saving means interfaced with said receiver means for saving to a second file on said mass storage means all portions of memory of said second host processor that are utilized by said second data base management means upon receipt of said notification.

7. The system of claim 6, further comprising classification means interfaced with said error detection means for classifying an error into one of a plurality of error classes, wherein said plurality of error classes indicate levels of severity of the error, said first saving means is responsive to said error class and is activated only if the error is in a predetermined one of said plurality of error classes, and said second saving means is responsive to said one error class and is activated only if the error is in said predetermined one of said plurality of error classes.

* * * * *